(12) United States Patent
Plee

(10) Patent No.: US 6,464,756 B1
(45) Date of Patent: *Oct. 15, 2002

(54) PURIFICATION OF HYDROGEN FLOWSTREAMS BY SELECTIVELY ADSORBING IMPURITIES THEREFROM

(75) Inventor: Dominique Plee, Lons (FR)

(73) Assignee: Ceca S.A., Puteaux (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/013,237

(22) Filed: Jan. 26, 1998

(30) Foreign Application Priority Data

Jan. 24, 1997 (FR) ............................................. 97 00784

(51) Int. Cl.⁷ ............................................. B01D 53/047
(52) U.S. Cl. ............................... 95/96; 95/130; 95/140; 95/902
(58) Field of Search ............................... 95/96, 98, 101, 95/130, 140, 902

(56) References Cited

U.S. PATENT DOCUMENTS

| | | | | |
|---|---|---|---|---|
| 3,839,847 A | * | 10/1974 | Banikiotes et al. ....... | 95/130 X |
| RE31,014 E | * | 8/1982 | Sircar ...................... | 95/140 X |
| 4,432,774 A | * | 2/1984 | Jüntgen et al. ........... | 95/140 X |
| 4,477,267 A | * | 10/1984 | Reiss ....................... | 95/140 X |
| 4,859,217 A | | 8/1989 | Chao ........................ | 55/68 |
| 4,943,304 A | * | 7/1990 | Coe et al. ................. | 95/140 X |
| 5,015,272 A | * | 5/1991 | Okada et al. ............. | 95/140 X |
| 5,133,785 A | * | 7/1992 | Kumar et al. ............. | 95/140 X |
| 5,152,813 A | * | 10/1992 | Coe et al. ................. | 95/130 X |
| 5,174,979 A | * | 12/1992 | Chao et al. ............... | 95/130 X |
| 5,220,797 A | * | 6/1993 | Krishnamurthy et al. . | 95/130 X |
| 5,234,472 A | * | 8/1993 | Krishnamurthy et al. . | 95/140 X |
| 5,258,060 A | * | 11/1993 | Gaffney et al. ........... | 95/130 X |
| 5,266,102 A | | 11/1993 | Gaffney et al. ............ | 95/103 |
| 5,268,023 A | | 12/1993 | Kirner ...................... | 95/103 |
| 5,464,467 A | * | 11/1995 | Fitch et al. ............... | 95/130 X |
| 5,489,327 A | * | 2/1996 | Otsuka et al. ............ | 95/130 X |
| 5,551,257 A | * | 9/1996 | Jain .......................... | 95/130 X |
| 5,584,912 A | * | 12/1996 | Li et al. ................... | 95/130 X |
| 5,616,170 A | * | 4/1997 | Ojo et al. ................. | 95/130 X |
| 5,674,311 A | * | 10/1997 | Notaro et al. ............. | 95/130 X |

FOREIGN PATENT DOCUMENTS

| | | | | |
|---|---|---|---|---|
| EP | 0667183 | | 8/1995 | |
| JP | 60-103002 | * | 6/1985 | ................. 95/140 |
| JP | 60-139337 | * | 7/1985 | ................. 95/140 |
| JP | 61-247612 | * | 11/1986 | ................. 95/140 |
| JP | 01-080418 | * | 3/1989 | ................. 95/140 |

* cited by examiner

*Primary Examiner*—Robert H. Spitzer
(74) *Attorney, Agent, or Firm*—Burns, Doane, Swecker & Mathis, L.L.P.

(57) ABSTRACT

Predominantly hydrogen gaseous flowstreams containing contaminating amounts of at least carbon monoxide and/or nitrogen impurities are purified by PSA adsorption of such impurities therefrom, via transport over a faujasite zeolite adsorbent, the Si/Al ratio of which ranges from 1 to 3, preferably from 1 to 1.5, and at least 85% of the aluminum tetrahedra comprising the crystal lattices being combined with lithium and calcium cations, the lithium/lithium+calcium ratio therein being at least 70%.

7 Claims, 2 Drawing Sheets

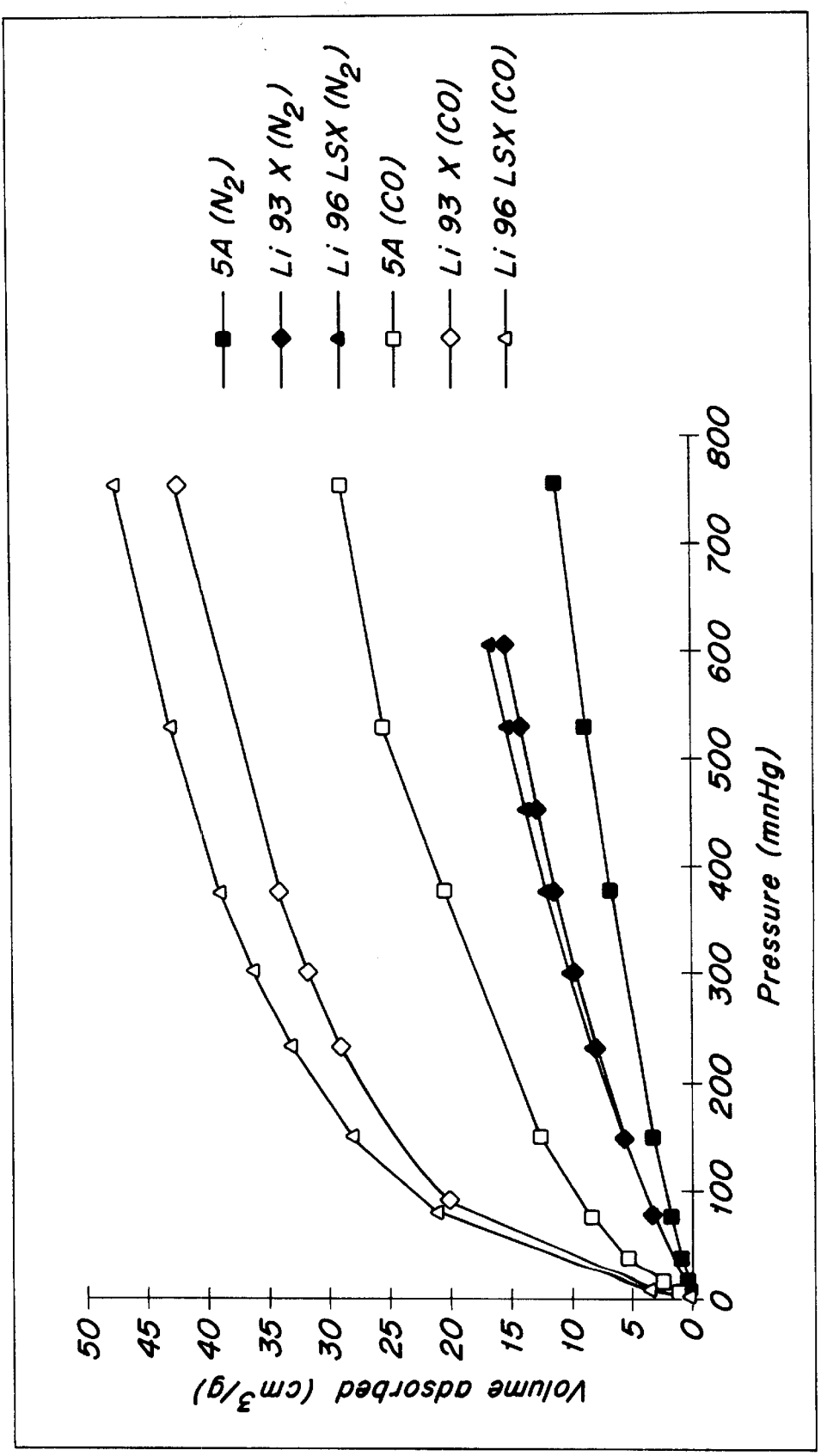

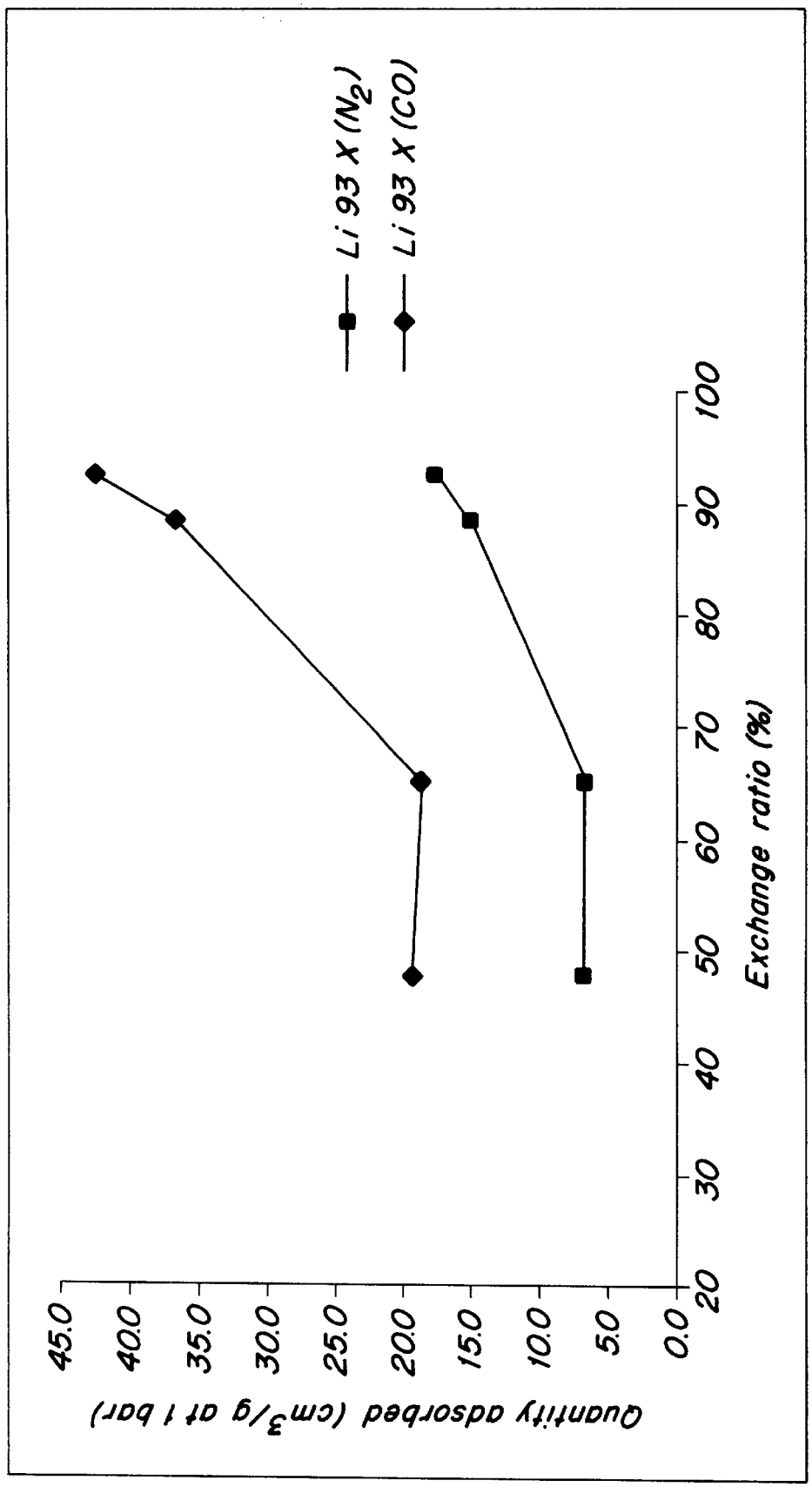

PURIFICATION OF HYDROGEN FLOWSTREAMS BY SELECTIVELY ADSORBING IMPURITIES THEREFROM

BACKGROUND OF THE INVENTION

1. Technical Field of the Invention

The present invention relates to selectively adsorbing impurities contaminating gaseous flowstreams, particularly gas flows composed principally of hydrogen.

The present invention more especially relates to selective adsorption employing adsorbents obtained by exchanging the lithium atoms of zeolites of faujasite type and, even more especially, among these, zeolites having a low Si/Al ratio.

2. Description of the Prior Art

The purification of hydrogen via adsorption is a significant industrial process to date widely practiced. It entails the recovery of hydrogen from a mixture of several constituents originating from the catalytic reforming of natural gas, from plants for the production of ammonia or from ethylene synthesis units. The principle of pressure-modulated adsorption (hereinbelow PSA, for Pressure Swing Adsorption) is applied in order to obtain hydrogen of high purity. In practice, in order to properly operate a PSA process, the gas to be purified is conveyed through a bed of adsorbent at high pressure, during which stage the impurities are selectively adsorbed onto the adsorbent. When the latter is saturated, it is purged and then desorbed by lowering the pressure. The adsorbent thus being regenerated, recompression is carried out to return the system to the original starting conditions. This type of process, except for the thermal effects induced by the adsorption and the desorption of the molecules, is virtually isothermal and proves to be highly advantageous from an energy viewpoint.

The impurities are most typically $CO_2$, $NH_3$, $N_2$, $CO$, $CH_4$ and $C_1$–$C_4$ hydrocarbons, at contents ranging from a few ppm to a few percent. In practice, the adsorbent is a bed of alumina or silica gel for retaining water, of active charcoal for retaining $CO_2$ and $CH_4$ and of molecular sieve for trapping $CO$ and $N_2$.

The first industrial plant, which dates from 1967, is described by UCC in U.S. Pat. No. 3,430,418 and, to date, the zeolite adsorbent used is a molecular sieve of type 5A. Such zeolites have the faujasite structure, a description of which appears in *Handbook of Molecular Sieves* by R. Szostak, published by Van Norstrand Reinhold (1992). Zeolites are generally crystalline solids, the crystal lattice of which is formed by the condensation of tetrahedra, typically silicon and aluminum tetrahedra, by means of bridging oxygen atoms. In certain instances, the tetrahedra can contain other elements, such as boron, gallium, titanium, vanadium or iron, instead of aluminum, and essentially phosphorus in partial or complete substitution for silicon. It is also possible to prepare zeolites which contain only silicon oxide. These products are chemically analogous to silicas (quartz or cristobalite), but possess the principal characteristic of zeolites, namely, a perfectly calibrated and regular porosity. It is possible to adjust the proportion of silicon and of aluminum in a given structure: it is thus possible to prepare faujasite for Si/Al ratios of between 1 and 4. Depending on the types of zeolite, the pore sizes range from 0.3 to 0.8 nm (3 Å to 8 Å) for solids formed by condensation of silicon and aluminum tetrahedra. Microporous structures of aluminophosphate type are known which exhibit pores of larger size, in the region of 1.2 nm (12 Å). Certain zeolite structures possess only a single type of pore opening, whereas others exhibit two, indeed three, different pore networks intersecting or not within the crystal. These highly varied characteristics present numerous possibilities of using zeolites in fields as diverse as ion exchange, catalysis or adsorption.

The introduction of aluminum into the crystal lattice can be interpreted as a substitution of the tetravalent silicon by an element with a lower charge, in this case trivalent. As the number of oxygen atoms, and thus of negative charges, remains constant, a negative charge is established for each aluminum atom introduced. The charges are then balanced by the insertion of charge-compensating ions, such as alkali metals or alkaline earth metals. These cations are capable of being exchanged in solution, which contributes certain specific properties to the solid: thus, a zeolite A, in the sodium form, has a pore opening of 0.4 nm. When exchanged with calcium, the size of its pores increases slightly to 0.5 nm, which modifies the properties of the adsorbent. The latter then becomes capable of adsorbing normal paraffins, while excluding the bulkier branched paraffins. The exchange of zeolite A with potassium, on the other hand, reduces the pore size to 0.3 nm, which permits this zeolite to adsorb only water or ammonia.

The use of these adsorbents is thus potentially promising in the $H_2$ PSA application. It is curious to observe that the literature is relatively sparse as regards useful adsorbents. Mitsubishi reports, in its Japanese Application JP-01080418, the zeolite of type X exchanged with calcium for adsorbing carbon monoxide. Studies relating to the influence of the electrostatic potential of the cation on the properties of adsorbing CO have been carried out by Bose et al., Proc. 6th Int. Zeolite Conf., p. 201 (1983). The authors have demonstrated that the decreasing direction of the energies for zeolite A was:

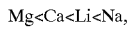

which is the decreasing order of the charge/size ratios.

In certain systems, the authors recommend adsorbents capable of very selectively adsorbing CO, while minimizing the adsorption of $N_2$ or $CO_2$ (EP-A-224,150, Nippon Kokan Kabushiki Kaisha). This is accomplished by exchange and then impregnation, by means of a copper salt, of a zeolite of type Y or ZSM5: it is considered that the active species is monovalent copper, which is formed under reducing conditions and makes possible the formation of bonds between the $\pi$ electrons of the CO and an empty d orbital of the copper. Nevertheless, these adsorbents have the distinguishing feature of poorly regenerating under PSA conditions, due to the very high energies involved. The improvement of adsorption processes thus remains a serious need in this art, either to decrease the size of plants or to decrease operating costs.

SUMMARY OF THE INVENTION

It has now unexpectedly been determined that the lithium form of zeolites of faujasite type in which the Si/Al ratio of the lattice ranges from 1 to 3, preferably from 1 to 1.5, constitutes a class of adsorbents which is far superior to the adsorbents to date used for purifying hydrogen from the impurities which it contains, essentially carbon monoxide and nitrogen. These adsorbents have adsorption capacities for CO and $N_2$ which are particularly high and present the advantage over adsorbents of faujasite type exchanged with calcium ions of exhibiting isotherms which are more linear, which is favorable for application in PSA.

BRIEF DESCRIPTION OF THE DRAWINGS

FIG. 1 is an adsorption isotherm of CO and $N_2$ for different lithium faujasites;

FIG. 2 shows changes in adsorption capacities for lithium-exchanged zeolite X as a function of the exchange ratio.

DETAILED DESCRIPTION OF BEST MODE AND SPECIFIC/PREFERRED EMBODIMENTS OF THE INVENTION

More particularly according to the present invention, the adsorption isotherm for CO and for $N_2$ of a lithium faujasite with an Si/Al ratio of 1 is set forth in FIG. 1, in comparison with a zeolite 5A commonly used in $H_2$ PSAs, and the change in the adsorption capacity for CO as a function of the degree of lithium exchange of the adsorbent is represented in FIG. 2. These specific materials are known to this art and are described in the $O_2$ PSA/VSA application (U.S. Pat. No. 4,859,217).

Nonetheless, to date these have never been considered for purifying a hydrogen stream containing amounts of CO and $N_2$ which can range from 0.5% to 4%.

It has now also been surprisingly determined that these faujasites with an Si/Al ratio of 1 to 3, a large proportion of the exchange sites of which is occupied by lithium cations, retain a high performance in the purification of hydrogen when the remaining sites, i.e., exchangeable sites which are not occupied by lithium, are occupied by other alkali metal or alkaline earth metal cations, preferably by calcium, for as much as the ratio of the lithium to the other alkali metal or alkaline earth metal ions, in particular calcium, is at least 70%. It too has been confirmed that this distinctive feature is restricted to the structures of faujasite type which it has transformed and that the exchange of zeolite A with lithium or lithium/calcium mixtures does not specifically improve the adsorption capacities for CO and $N_2$.

The present invention thus features an improvement in PSA processes for the production of purified hydrogen from gas mixtures containing, in addition to hydrogen, carbon monoxide and/or nitrogen, the improvement comprising utilizing an adsorbent which is a faujasite, the Si/Al ratio of which has a value of 1 to 3, preferentially 1 to 1.5, and in the lattice of which at least 85% of the aluminum tetrahedra are combined with lithium and calcium cations, the lithium/lithium+calcium ratio being at least 70%, the remainder of the exchange capacity, that is at most 15%, being occupied by alkali metal ions other than the lithium ion or alkaline earth metal ions other than the calcium ion. These ions generally result from the actual synthesis (Na and K). Faujasites of type LSX, namely, faujasites in which the Si/Al ratio is equal to unity (deviations from unity reflecting either contamination of the product by small amounts of zeolites having a different Si/Al ratio or experimental inaccuracy in assessing the Si/Al ratio), are very particularly effective.

The adsorbents of the invention quite simply are employed in place of the adsorbents of the prior art and require no substantial modification of existing PSA plants/facilities.

In order to further illustrate the present invention and the advantages thereof, the following specific examples are given, it being understood that same are intended only as illustrative and in nowise limitative.

In said examples to follow, the various experimental zeolites are represented by symbols of the $Ca_nLi_mZ$ type, in which the indices following the chemical element indicate its degree of exchange and the letters Z indicate the type of zeolite.

EXAMPLE 1
Preparation of a faujasite LSX

A zeolite of faujasite type with a ratio Si/Al=1 (faujasite LSX) was prepared by mixing, at room temperature, a sodium potassium aluminate solution and a sodium silicate solution. The aluminate solution was prepared by dissolving, at 110°–115° C., 15.6 g of alumina trihydrate of gibbsite type in a solution composed of 100 ml of water, 33.68 g of sodium hydroxide pellets and 17.92 g of potassium hydroxide pellets. After dissolution, the solution was cooled to a temperature of 20° C. and increased in volume with water in order to compensate for evaporation losses.

The silicate solution was composed of 100 ml of water and 47.05 g of sodium silicate (25.5% $SiO_2$, 7.75% $Na_2O$). After homogenous mixing of the two solutions, which are formulated via any technique known to this art, maturing or aging was carried out for 30 hours at 50° C., followed by crystallization at 95° C. for 3 hours. The solids recovered were filtered and then washed with approximately 15 ml/g of distilled water; after drying at 80° C., a portion of the solids was calcined at a temperature of 550° C. under air for 2 hours. Its adsorption capacity for toluene was measured at 25° C. under a partial pressure of 0.5 bar. A value of 22.5% by weight was determined, indicating good crystallinity. The crystal unit cell, as determined by chemical analysis, was: $K_2Na_{74}(Si_{96}Al_{96})O_{384}$; it was that of an LSX.

EXAMPLE 2

A zeolite X with a ratio Si/Al=1.25, with a toluene adsorption value of 23.2%, was ion-exchanged by means of a 1M lithium chloride solution at 80° C. The lithium introduced in the solution corresponded to 157% of the exchange capacity. After exchange, the product was washed with 10 ml of distilled water containing $10^{-4}$ mol/l of lithium hydroxide per gram of zeolite.

The same operation was carried out while doubling the number of exchanges. The solids obtained, known respectively as $Li_{48}X$ and $Li_{65}X$, had degrees of exchange, expressed by $Li_2O/Li_2O+Na_2O$, of 48% and 65%.

Exchange operations were carried out on the same base zeolite X with a 4M lithium chloride solution at 80° C. while using a liquid/solid ratio of 10 ml/g. The products obtained, $Li_{89}X$ and $Li_{93}X$, were subjected to three and four exchanges respectively and their degrees of exchange were 89% and 93%.

EXAMPLE 3

The adsorption capacities for CO and for nitrogen at 30° C. were measured after having calcined the solids prepared in Example 2 under air at 550° C. for 2 hours and then degassing same under vacuum at 300° C. The results are reported in Table I below, on the one hand as adsorption capacities for the two gases at a pressure of 1 bar and, on the other, as ratios of the capacities at 1 bar and at 0.2 bar, which provides information on the curvature of the isotherm. The data were compared with the values obtained on an industrial 5A molecular sieve with a calcium degree of exchange of 75%–85%. The column Li % reflects the values of the degree of exchange for lithium $(Li_2O)/(Li_2O+Na_2O)$.

TABLE I

| | Li % | CO (1 bar) (mmol/g) | CO (1 bar) CO (0.2 bar) | $N_2$ (1 bar) (mmol/g) | $N_2$ (1 bar)/ $N_2$ (0.2 bar) |
|---|---|---|---|---|---|
| $Li_{48}X$ | 48 | 0.86 | 2.81 | 0.31 | 4.93 |
| $Li_{65}X$ | 65 | 0.83 | 2.83 | 0.29 | 4.71 |
| $Li_{89}X$ | 89 | 1.64 | 2.45 | 0.67 | 3.26 |
| $Li_{93}X$ | 93 | 1.90 | 1.71 | 0.78 | 3.14 |
| Ind. 5A | — | 1.38 | 2.4 | 0.53 | 3.68 |

In light of these data, zeolites of faujasite type exchanged with lithium exhibit, from a degree of exchange which can be estimated at 80%–85%, an adsorption capacity for nitrogen and for carbon monoxide which is greater than that which would be obtained utilizing a zeolite 5A.

EXAMPLE 4

The zeolite LSX described in Example 1 was exchanged by means of a 1M lithium chloride solution at 80° C. The lithium introduced in the solution corresponded to 145% of the stoichiometry of exchange. After exchange, the product was washed with 10 ml of distilled water containing $10^{-4}$ mol/l of lithium hydroxide per gram of zeolite.

The same operation was carried out while doubling the number of exchanges. The solids obtained, known, respectively, as $Li_{42}LSX$ and $Li_{74}LSX$, had degrees of exchange of 42% and 74%.

A series of exchanges was then carried out on the same LSX powder, from a 4M lithium chloride solution. The stoichiometry in the first exchange was equal to 58.2% of the exchange capacity. Solids $Li_{91}LSX$ and $Li_{96}LSX$ were thus obtained in which the degrees of exchange were 91% and 96.7%, respectively.

After washing and drying under conditions identical to those for $Li_{42}LSX$ and $Li_{74}LSX$, the adsorbents were calcined at 550° C. under air for 2 hours and then degassed under vacuum at 300° C. Their adsorption capacity for nitrogen and for carbon monoxide was then measured at 30° C. The results are reported in Table II below, in which are indicated the capacities at 1 bar for the two gases and the ratios of said capacities at a pressure of 1 bar to said capacities at a pressure of 0.2 bar. The data relating to an industrial 5A sieve and the starting unexchanged zeolite LSX are also included for purposes of comparison.

TABLE II

| | Li % | CO (1 bar) (mmol/g) | CO (1 bar) CO (0.2 bar) | $N_2$ (1 bar) (mmol/g) | $N_2$ (1 bar)/ $N_2$ (0.2 bar) |
|---|---|---|---|---|---|
| LSX | — | 0.63 | 4.26 | 0.24 | 4.9 |
| $Li_{42}LSX$ | 42 | 0.66 | 4 | 0.25 | 4.67 |
| $Li_{74}LSX$ | 74 | 0.94 | 2.93 | 0.35 | 4.39 |
| $Li_{91}LSX$ | 91 | 1.8 | 1.86 | 0.87 | 3.49 |
| $Li_{96}LSX$ | 96.7 | 2.12 | 1.69 | 1 | 3.48 |
| Ind. 5A | — | 1.38 | 2.4 | 0.53 | 3.68 |

As with the faujasite X, the zeolite LSX exhibited adsorption capacities for nitrogen and for carbon monoxide which were greater than those of the zeolite 5A.

EXAMPLE 5

In order to demonstrate that the subject effect was definitely specific to zeolites of faujasite type, a zeolite of type A was exchanged with lithium, with a 1M lithium chloride solution, at the exchange temperature of 80° C. The stoichiometry of the solution targeted for the first exchange was 143%. After exchanging for two hours, the solids were filtered off and washed with a $10^{-4}$ mol/l solution of lithium hydroxide in distilled water in the proportion of 10 ml of solution per gram of zeolite. A second and then a third exchange were subsequently carried out under identical conditions. The solids obtained are known, respectively, as $Li_{35}A$, $Li_{57}A$ and $Li_{74}A$ and exhibited degrees of exchange of 35%, 57% and 74.5%.

As in the preceding examples, calcination was carried out at 550° C. under air for two hours and the adsorption capacities for nitrogen and for carbon monoxide were then measured at 30° C. after degassing in a vacuum at 300° C. The results are summarized in Table III below, which also includes the data corresponding to zeolite 4A which had not been exchanged with lithium.

TABLE III

| | Li % | CO (1 bar) (mmol/g) | CO (1 bar) CO (0.2 bar) | $N_2$ (1 bar) (mmol/g) | $N_2$ (1 bar)/ $N_2$ (0.2 bar) |
|---|---|---|---|---|---|
| Zeolite 4A | | 1.03 | 3.66 | 3.66 | 4.63 |
| $Li_{35}A$ | 35 | 1.13 | 3.33 | 3.33 | 4.75 |
| $Li_{57}A$ | 57 | 1.03 | 3.71 | 3.71 | 4.67 |
| $Li_{74}A$ | 74 | 0.91 | 3.92 | 0.28 | 4.77 |

It is clearly apparent that the capacities for the two gases under consideration do not increase as a function of the degree of exchange, in contrast to what was observed for zeolites of the faujasite type. With regard to the ratios of the capacities at 1 to the capacities at 0.2 bar, they do not change either very significantly.

EXAMPLE 6

In this example, the behavior of zeolites of type LSX, which had been exchanged with calcium and lithium, was evaluated in order to determine a possible difference in properties with respect to the sodium+lithium form, or with respect to the calcium+sodium form. For this, the solid $Li_{91}LSX$ was treated by means of a 0.23M calcium chloride solution for one hour at 70° C. The amount of calcium introduced represented 20% of the exchange capacity of the zeolite. Once the operation had been carried out, the solids were filtered and washed with 10 ml of water per gram of zeolite. In the same manner, the zeolite of Example 1 was exchanged by means of a 1.5M calcium chloride solution at 70° C. for two hours. The amount introduced represented 153% of the stoichiometry. The solids were filtered and then washed with 10 ml of water per gram of zeolite. The exchange was then repeated under the same conditions and solids were obtained in which the degree of exchange was 84%, the degree of exchange of the solids obtained from $Li_{91}LSX$ being distributed, thus:

(a) 69% lithium (b) 22% calcium (c) 25% sodium+potassium

These solids thus exhibit an overall calcium+lithium degree of exchange of 91% with an Li/Li+Ca ratio of 76%. Their adsorption properties were compared with those of $Li_{91}LSX$.

The adsorption values for carbon monoxide and for nitrogen, after pretreatments analogous to those of the preceding examples, on these two adsorbents and on the above-mentioned CaLSX are reported in Table IV below:

TABLE IV

| | CO (1 bar) (mmol/g) | CO (1 bar) CO (0.2 bar) | $N_2$ (1 bar) (mmol/g) | $N_2$ (1 bar)/ $N_2$ (0.2 bar) |
|---|---|---|---|---|
| $Ca_{84}LSX$ | 1.47 | 1.49 | 1.04 | 2.33 |
| $Ca_{22}Li_{69}LSX$ | 1.8 | 1.8 | 0.85 | 3.40 |
| $Li_{91}LSX$ | 1.8 | 1.86 | 0.87 | 3.49 |

These results evidence that the mixed calcium and lithium exchanged adsorbent exists as a lithium sieve with the same overall degree of exchange. There was not a sufficient amount of calcium ions to induce the effects (high curvature of isotherms) which were observed with the solids exchanged to 84%.

EXAMPLE 7

In this example, the adsorption properties of zeolite 4A, exchanged either with calcium alone or by means of calcium and lithium, were compared. After similar treatments to those of the preceding example, three solids were obtained for which the sum of the degrees of calcium+lithium exchange was virtually constant:

| | | |
|---|---|---|
| $Ca_{76}A$ | Calcium = 76% | |
| $Ca_{70}Li_{10}A$ | Calcium = 69.7% | Lithium = 10.2% |
| $Ca_{40}Li_{37}A$ | Calcium = 40.3% | Lithium = 36.6% |

The adsorption values for carbon monoxide and nitrogen at 30° C., after the degassing stages described in the preceding examples, are reported in Table V below:

TABLE V

| | CO (1 bar) (mmol/g) | CO (1 bar) CO (0.2 bar) | $N_2$ (1 bar) (mmol/g) | $N_2$ (1 bar)/ $N_2$ (0.2 bar) |
|---|---|---|---|---|
| $Ca_{76}A$ | 1.25 | 2.36 | 0.52 | 3.3 |
| $Ca_{70}Li_{10}A$ | 1.3 | 2.36 | 0.52 | 3.7 |
| $Ca_{40}Li_{37}A$ | 1.27 | 2.25 | 0.52 | 3.23 |

It was thus apparent that, over a wide range of degrees of mixed calcium+lithium exchange, the adsorbent composed of zeolite A behaved as a sieve containing only calcium as the principal cation. In contrast to the preceding example, it was concluded that the adsorption properties of a zeolite A having calcium and lithium in the exchange position will be identical to those of physical mixtures of zeolite exchanged with lithium and of zeolite exchanged with calcium.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process of purifying a predominantly hydrogen flowstream, comprising purifying the predominantly hydrogen flowstream via the PSA adsorption of contaminating amounts of at least carbon monoxide and nitrogen impurities therefrom, wherein the adsorbent therefor comprises a faujasite zeolite having a Si/Al ratio ranging from 1 to 3, and at least 85% of the aluminum tetrahedra comprising the crystal lattices of a combination of lithium and calcium cations, the lithium/lithium+calcium ratio therein being at least 70%.

2. The process as defined by claim 1, the Si/Al ratio of said faujasite zeolite ranging from 1 to 1.5.

3. The process as defined by claim 1, said faujasite zeolite comprising faujasite LSX.

4. The process as defined by claim 1, the Si/Al ratio of said faujasite zeolite being about 1.

5. A purified predominantly hydrogen flowstream prepared by a process of purifying the predominantly hydrogen flowstream via the PSA adsorption of contaminating amounts of at least carbon monoxide and nitrogen impurities therefrom, wherein the adsorbent therefor comprises a faujasite zeolite having a Si/Al ratio ranging from 1 to 3, and at least 85% of the aluminum tetrahedra comprising the crystal lattices of a combination of lithium and calcium cations, the lithium/lithium+calcium ratio therein being at least 70%.

6. A process for purifying a flowstream, comprising contacting a gaseous flowstream with a PSA adsorbent to remove carbon monoxide and nitrogen impurities; said gaseous flowstream comprising a predominant amount of hydrogen gas and a contaminating amounts of carbon monoxide gas and nitrogen gas in a range of 0.5 to 4% by volume of said gaseous flowstream; and said adsorbent comprising a faujasite zeolite having a Si/Al ratio ranging from 1 to 3, and at least 85% of the aluminum tetrahedra comprising the crystal lattices of a combination of lithium and calcium cations, the lithium/lithium+calcium ratio therein being at least 70%.

7. A process for purifying a flowstream, comprising contacting a gaseous flowstream with a PSA adsorbent to remove carbon monoxide and nitrogen impurities; said gaseous flowstream comprising a predominant amount of hydrogen gas and contaminating amounts of carbon monoxide gas and nitrogen gas in a range of 0.5 to 4% by volume of said gaseous flowstream; and said adsorbent comprising a zeolite with an empirical formula $Li_{93}X$ having an Si/Al ratio of 1.25, and 93% degrees of ion exchange.

* * * * *

UNITED STATES PATENT AND TRADEMARK OFFICE
CERTIFICATE OF CORRECTION

PATENT NO. : 6,464,756 B1
DATED : October 15, 2002
INVENTOR(S) : Dominique Plee

It is certified that error appears in the above-identified patent and that said Letters Patent is hereby corrected as shown below:

Column 4,
Line 21, change "K2" to -- K22 --;

Column 6,
Line 40, change "25%" to -- 9% --;
Table III, under column "$N_2$ (1 bar) (mmol/g)," change "3.66" to -- 0.34 --; change "3.33" to -- 0.34 --; change "3.71" to -- 0.31 --;
For Tables I, II, III, IV and V, please change the header line, column 4 to read
-- CO (1 bar)/
    CO (0.2 bar) --

Signed and Sealed this

Fifteenth Day of July, 2003

JAMES E. ROGAN
*Director of the United States Patent and Trademark Office*